(12) United States Patent
Liao (10) Patent No.: US 6,416,355 B1
(45) Date of Patent: Jul. 9, 2002

(54) WIRE-WINDING BOX HAVING MULTIPLE TRANSMISSION FUNCTION

(76) Inventor: Sheng Hsin Liao, No. 10, Alley 38, Lane 229, San Chun St., Shulin, Taipei Hsien (TW)

(*) Notice: Subject to any disclaimer, the term of this patent is extended or adjusted under 35 U.S.C. 154(b) by 0 days.

(21) Appl. No.: 09/942,554

(22) Filed: Aug. 31, 2001

(51) Int. Cl.[7] ........................ H01R 13/72; H01R 12/00; H01R 3/00
(52) U.S. Cl. ........................ 439/501; 439/76.1; 439/164
(58) Field of Search ................................ 439/501, 502, 439/164, 488, 489, 490, 76.1, 56

(56) References Cited

U.S. PATENT DOCUMENTS

| | | | | |
|---|---|---|---|---|
| 4,282,954 A | * | 8/1981 | Hill | 191/12.4 |
| 4,520,239 A | * | 5/1985 | Schwartz | 191/12.4 |
| 4,542,858 A | * | 9/1985 | Manges | 242/54 |
| 4,946,010 A | * | 8/1990 | DiBono | 191/12.2 |
| 5,422,957 A | * | 6/1995 | Cummins | 381/183 |
| 5,481,607 A | * | 1/1996 | Hsiao | 379/438 |
| 5,684,883 A | * | 11/1997 | Chen | 381/187 |
| 5,700,150 A | * | 12/1997 | Morin | 439/4 |
| 5,701,981 A | * | 12/1997 | Marshall et al. | 191/12.4 |
| 5,796,047 A | * | 8/1998 | Sheng-Hsin | 174/135 |
| 6,056,591 A | * | 5/2000 | Liao | 439/501 |
| 6,254,025 B1 | * | 7/2001 | Liao | 242/378.1 |
| 6,270,355 B1 | * | 8/2001 | Kihara | 439/56 |
| 6,287,141 B1 | * | 9/2001 | Hsieh Huang | 439/501 |
| 6,290,533 B1 | * | 9/2001 | Major | 439/490 |

* cited by examiner

Primary Examiner—P. Austin Bradley
Assistant Examiner—Edwin A. León
(74) Attorney, Agent, or Firm—Rosenberg, Klein & Lee (57) ABSTRACT

The present invention proposes a wire-winding box having multiple transmission function, which comprises a housing, a rotation disk, a scroll spring, two communication wires, and a circuit board. The rotation disk is disposed in a receiving tank of the housing. The scroll spring is disposed between the housing and the rotation disk. The two communication wires are wound on the rotation disk. Outer ends of the two communication wires can protrude out of the housing. The circuit board is disposed in the housing. Electronic elements such as light-emitting devices and IC voltage regulators are disposed on the circuit board. The circuit board is connected between inner ends of the two communication wires. A wire-winding box having a multi-functional transmission interface and wider usage is thus formed.

16 Claims, 11 Drawing Sheets

WIRE-WINDING BOX HAVING MULTIPLE TRANSMISSION FUNCTION

FIELD OF THE INVENTION

The present invention relates to a wire-winding box having multiple transmission function and, more particularly, to a wire-winding box, which is connected between communication wires via a circuit board to be used as a multifunctional transmission interface, thereby having more diversified and wider usage.

BACKGROUND OF THE INVENTION

Appropriate communication wires need to be accommodated to achieve electrical connection when using communications apparatuses such as computers, modems, telephones, or facsimile apparatuses. To avoid entanglement of wire due to a too-long length of external communication wire or inconvenience of use due to a too-short length of external communication wire, several kinds of wire-winding boxes applicable to various kinds of communications apparatuses have been proposed. Most of the wire-winding boxes comprise a housing, a communication wire, a rotation disk disposed in the housing, and a scroll spring. The plugs at two ends of the communication wire can be plugged on sockets of relevant communications apparatuses to accomplish communications of information.

Additionally, a communication wire may show a tight state due to resiliency of the scroll spring when it is pulled out from a conventional wire-winding box so that a proper length of the communication wire cannot be kept outside, resulting in much trouble in use for the user. Therefore, several kinds of wire-winding boxes capable of positioning the pulled-out communication wire in time have been proposed, wherein a swing sheet capable of resiliently swinging and gaps disposed at the periphery of a rotating disk and matched with retaining grooves are exploited to generate winding or positioning function.

However, a conventional wire-winding box has only the simple function of winding and arranging communication wires, and has no multifunctional transmission interface. Therefore, its use is much limited so that it cannot have wider usage.

SUMMARY OF THE INVENTION

The primary object of the present invention is to provide a wire-winding box having multiple transmission function, wherein a circuit board is disposed between communication wires. Electronic elements such as light-emitting devices and IC voltage regulators can be disposed on the circuit board. The circuit board can be used to display the use state. In addition to having the function of winding and arranging communication wires, the present invention also has a multifunctional transmission interface to achieve more diversified and wider usage.

To achieve the above object, the present invention provides a wire-winding box having multiple transmission function, which comprises a housing, a rotation disk, a scroll spring, two communication wires, and a circuit board. A receiving tank is formed in the housing. The rotation disk is pivotally disposed in the receiving tank. The scroll spring is disposed between the housing and the rotation disk. The communication wires are wound around the rotation disk. Outer ends of the two communication wires can protrude out of the housing. The circuit board is disposed in the housing. Light-emitting devices can be disposed on the circuit board. The circuit board is connected between inner ends of the two communication wires. A wire-winding box having multiple transmission function is thus formed.

The various objects and advantages of the present invention will be more readily understood from the following detailed description when read in conjunction with the appended drawing, in which:

DETAILED DESCRIPTION OF THE PREFERRED EMBODIMENTS

As shown in FIGS. 1 to 4, a wire-winding box having multiple transmission function according to a preferred embodiment of the present invention comprises a housing 1, a rotation disk 2, a first communication wire 3, a second communication wire 4, and a circuit board 5.

The housing 1 is composed of a first half housing 10 and a second half housing 11. A receiving tank 12 is formed in the housing 1. A circular pivot 13 is disposed in the receiving tank 12. A first wire outlet 14 and a second wire outlet 15 are disposed at two opposite sides of the housing 1, respectively. A circular through hole 16 and a push button hole 17 are disposed on the housing 1.

The rotation disk 2 is pivotally disposed in the receiving tank 12. The rotation disk 2 has a pivotal hole 20 so that it can be pivotally sleeved on the pivot 13 to rotate. A first winding ring 21 and a second winding ring 22 are disposed on two side faces of the rotation disk 2, respectively. The first winding ring 21 has a hook groove 23. A fixing post 18 is disposed in the housing 1. A spring seat 61 can be pivotally sleeved on the fixing post 18. A scroll spring 6 is sleeved on the spring seat 61. A hook end 60 of the scroll spring 6 received outside the rotation disk 2 can be retained in the hook groove 23 of the first winding ring 21 so that the scroll spring 6 can be disposed between the housing 1 and the rotation disk 2 to provide restoring resiliency of rotation for the rotation disk 2.

The second winding ring 22 is assembled on a side face of the rotation disk 2. The second winding ring 22 is a hollow circular cylinder. A plurality of lamp holes 24 and a circular flange 25 are disposed on the second winding ring 22. A plurality of retaining holes 26 are disposed at the edge of the second winding ring 22. A plurality of corresponding retaining block 27 are disposed on the rotation disk 2. The retaining hole 26 can be retained with the retaining block 27 so that the second winding ring 22 can be retained and assembled on a side face of the rotation disk 2. The flange 25 of the second winding ring 22 can be pivotally sleeved in the through hole 16 to rotate. Two corresponding wire grooves 28 are disposed on the sidewall of the second winding ring 22 to be passed through by the two communication wires 3 and 4.

The two communication wires 3 and 4 are wound around the second winding ring 22. That is, the two communication wires 3 and 4 are wound around a side face of the rotation disk 2 in single layer. Inner ends of the two communication wires 3 and 4 penetrate into the second winding ring 22 via the wire grooves 28. Outer ends of the two communication wires 3 and 4 protrude out of the housing 1 via the wire outlets 14 and 15, respectively. The outer ends of the two communication wires 3 and 4 can be assembled with various kinds of connection plugs, earphones, microphones, or other devices after they protrude out. In this embodiment, the communication wires 3 and 4 are connected to a first plug 30 and a second plug 40, respectively.

The circuit board 5 is a printed circuit board with a plurality of electronic elements such as light-emitting devices 50 and IC voltage regulators soldered thereon. The light-emitting devices 50 are electrically connected to the circuit board 5. The light-emitting devices 50 can be light-emitting diodes or light bulbs. A plurality of first conducting terminals 51 and second conducting terminals 52 are also disposed on the circuit board 5. The light-emitting devices 50 and the circuit board 5 are disposed in the second winding ring 22. The light-emitting devices 50 correspond to the lamp holes 24. The first conducting terminals 51 and the second conducting terminals 52 are electrically connected to the circuit board 5. The first conducting terminals 51 and the second conducting terminals 52 are respectively connected to the inner ends of the first communication wire 3 and the second communication wire 4 so that the circuit board 5 can be connected between the inner ends of the two communication wires 3 and 4.

The wire-winding box can be used to rewind and receive the communication wires 3 and 4 of considerable lengths at any time. A user can plug the plugs 30 and 40 of the communication wires 3 and 4 into sockets of relevant communication apparatuses to provide information communication. The communication wires 3 and 4 can be directly pulled out from the wire-winding box. A certain restoring tensile force can be kept due to the action of the scroll spring 6 on the communication wires 3 and 4 so that the communication wires 3 and 4 can be rewound into the box successfully. Therefore, entanglement of wire due to a too-long length of external wire will not arise.

Additionally, in order that a user will not be disturbed due to the tensile force when he pulls out the communication wires 3 and 4, a plurality of stop blocks 29 having unidirectional catching function are disposed at the peripheral edge of the rotation disk 2, and a control device 7 is disposed adjacent to the rotation disk 2. The control device 7 comprises a push button 70 and a spring 71. The push button 70 is matched in the push button hole 17. The spring 71 is disposed between the push button 70 and the housing 1. A catching block 72 is disposed on the push button 70. The spring 71 can push the push button 70 to slightly protrude out of the push button hole 17. The catching block 72 on the push button 70 can catch the stop block timely to catch the rotation disk 2 when the rotation disk 2 rotates.

Accordingly, owing to the push of the spring 71, the catching block 72 will catch the stop block 29 of the rotation disk 2 to stop the rotation of the rotation disk 2 when the rotation disk 2 rotates clockwise. When the communication wires 3 and 4 are pulled out to drive the rotation disk 2 to rotate counterclockwise, the stop block 29 will be smoothly detached from the catching block 72 through a bevel thereof so that the rotation disk 2 can rotate continually, hence facilitating continual pull of the communication wires 3 and 4. When the communication wires 3 and 4 are pulled out predetermined lengths and then released to let the rotation disk 2 steadily rewind due to uniform resiliency generated by the scroll spring 6 disposed beside the rotation disk 2, the stop block 29 of the rotation disk 2 will be caught by the catching block 72 to limit the rotation of the rotation disk 2 so that the communication wires 3 and 4 will not be further rewound. Therefore, the communication wires 3 and 4 of predetermined lengths can be kept outside to avoid the trouble of a user. It is only necessary for a user to press the push button 70 to detach the catching block 72 from the stop block 29 so that the rotation disk 2 can restore to rotate and quickly rewind the communication wires 3 and 4.

The present invention is characterized mainly in that the circuit board 5 is disposed between the communication wires 3 and 4, and electronic elements such as light-emitting devices 50 and IC voltage regulators are disposed on the circuit board 5. The light-emitting devices 50 can be used to display the use state. Therefore, in addition to having the function of rewinding and arranging communication wires, the present invention also has a multifunctional transmission interface to achieve diversified and wider usage.

Figure 1:
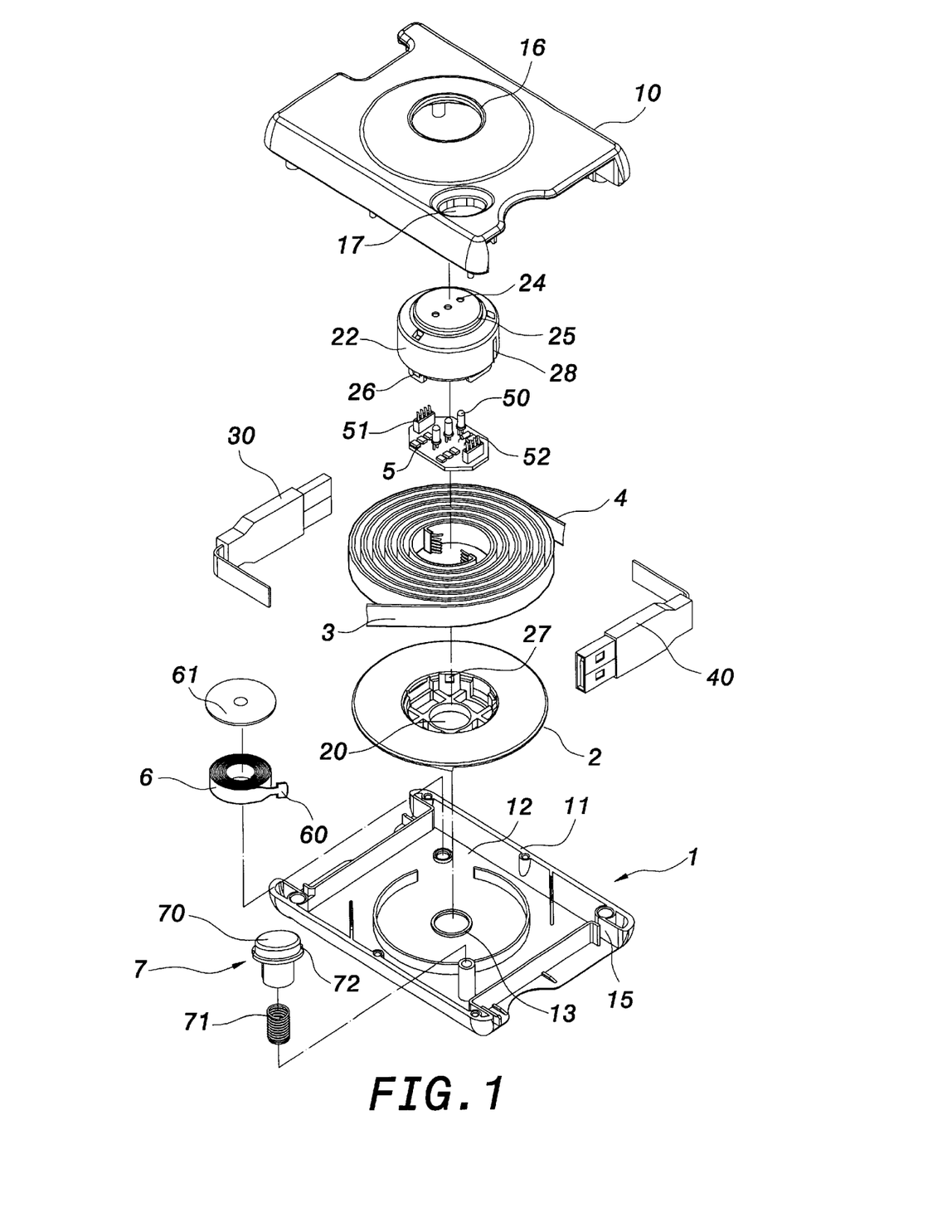
FIG. 1 is an exploded perspective view of a first embodiment of the present invention.
Figure 2:
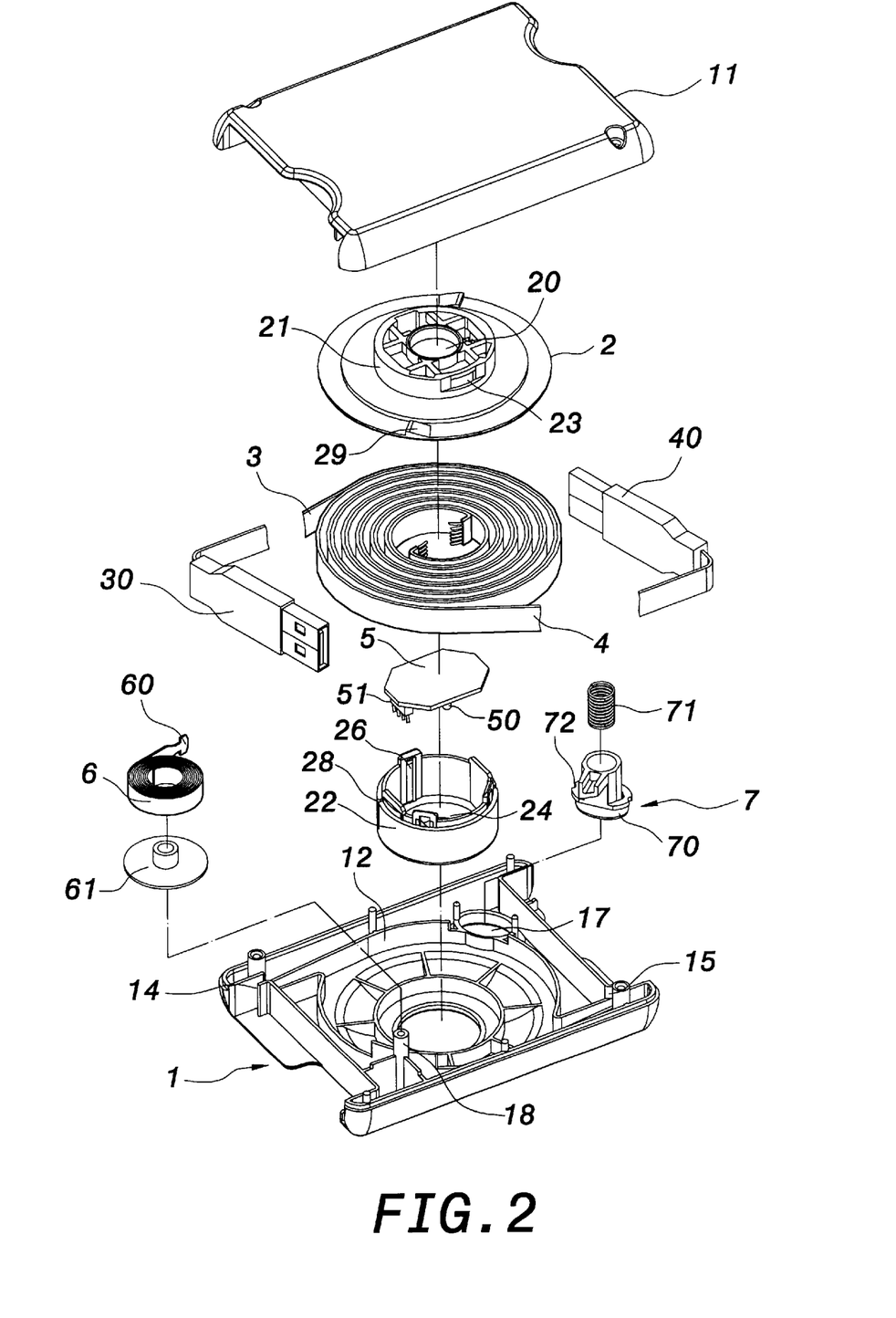
FIG. 2 is another exploded perspective view of the first embodiment of the present invention.
Figure 3:
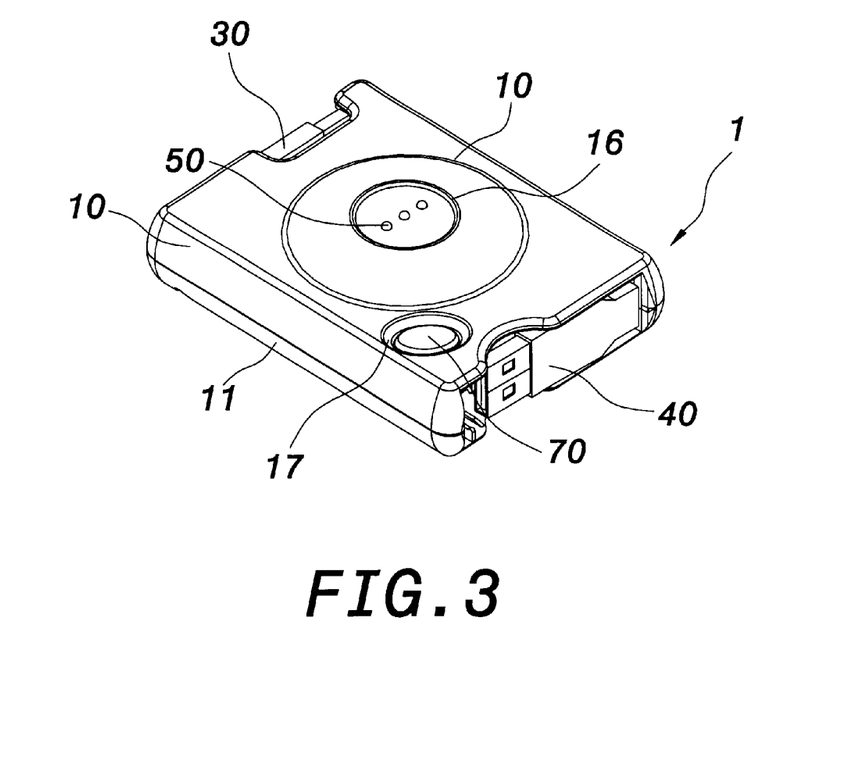
FIG. 3 is a perspective view of the first embodiment of the present invention.
Figure 4:
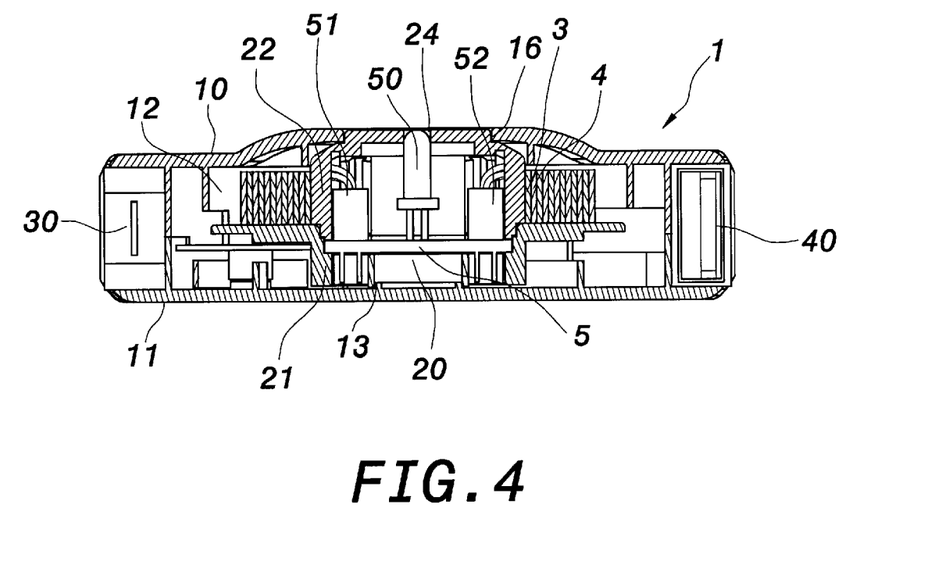
FIG. 4 is a cross-sectional view of the first embodiment of the present invention.
Figure 5:
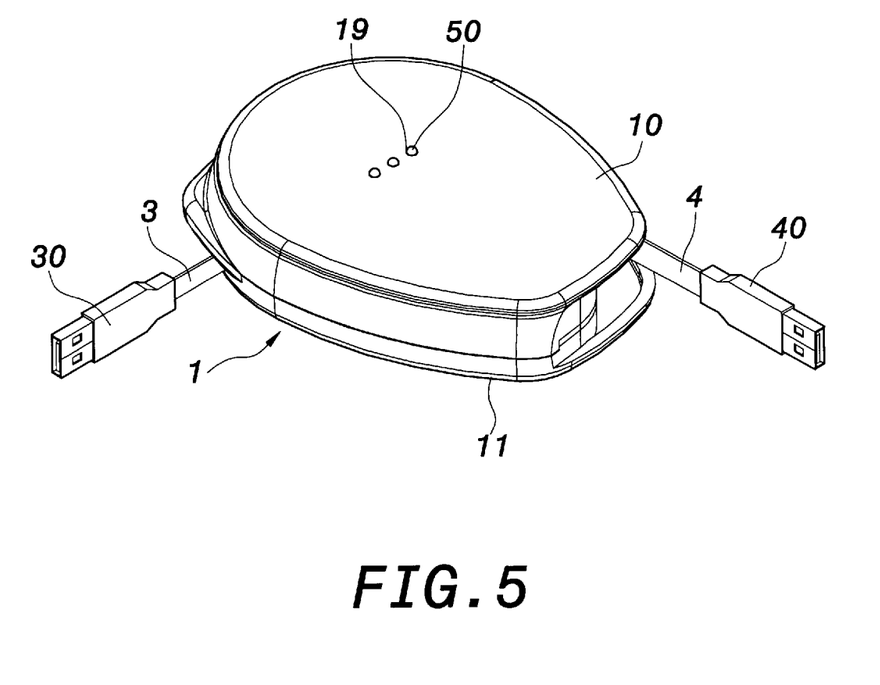
FIG. 5 is a perspective view of a second embodiment of the present invention.
Figure 6:
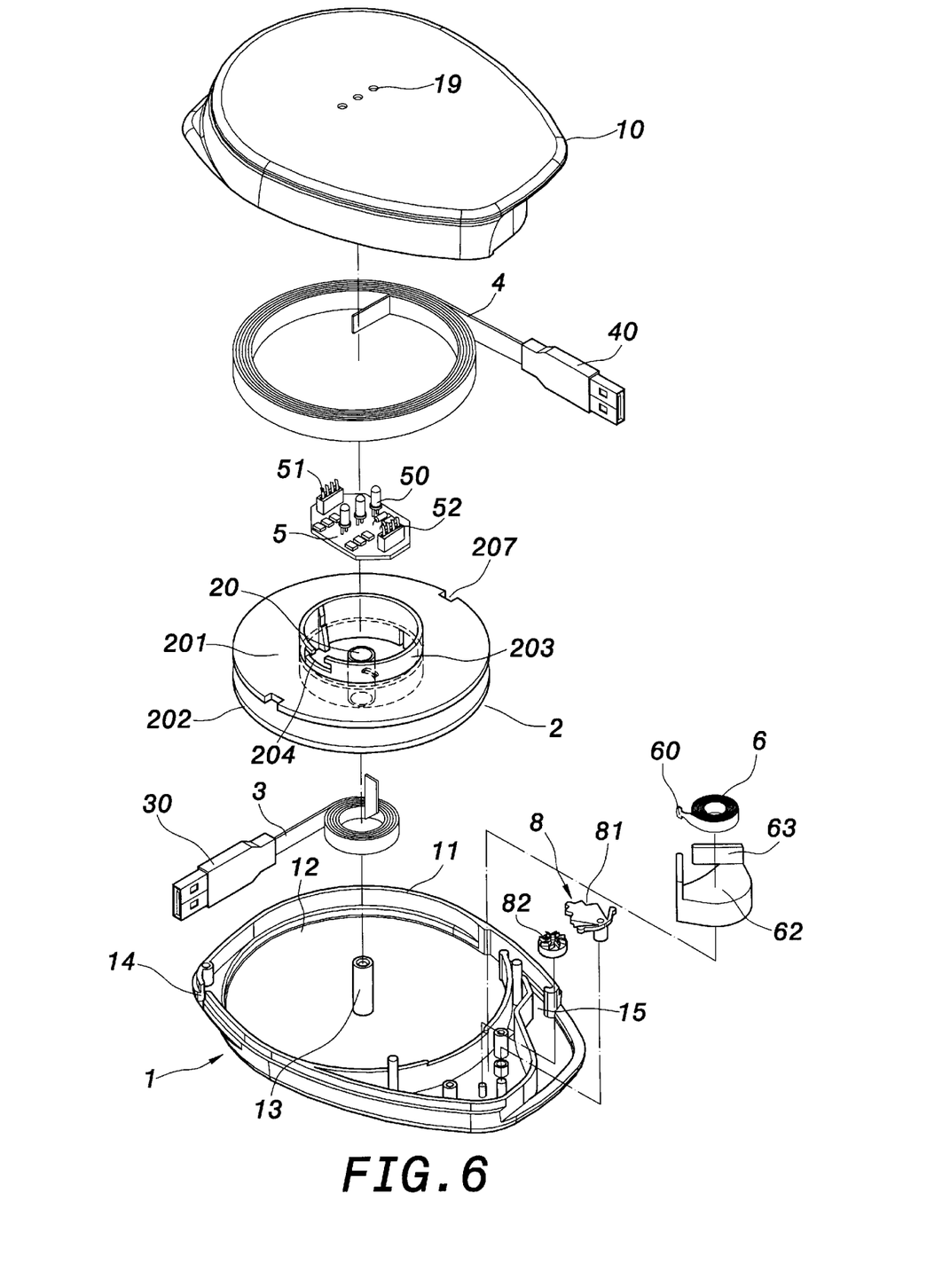
FIG. 6 is an exploded perspective view of the second embodiment of the present invention.
Figure 7:
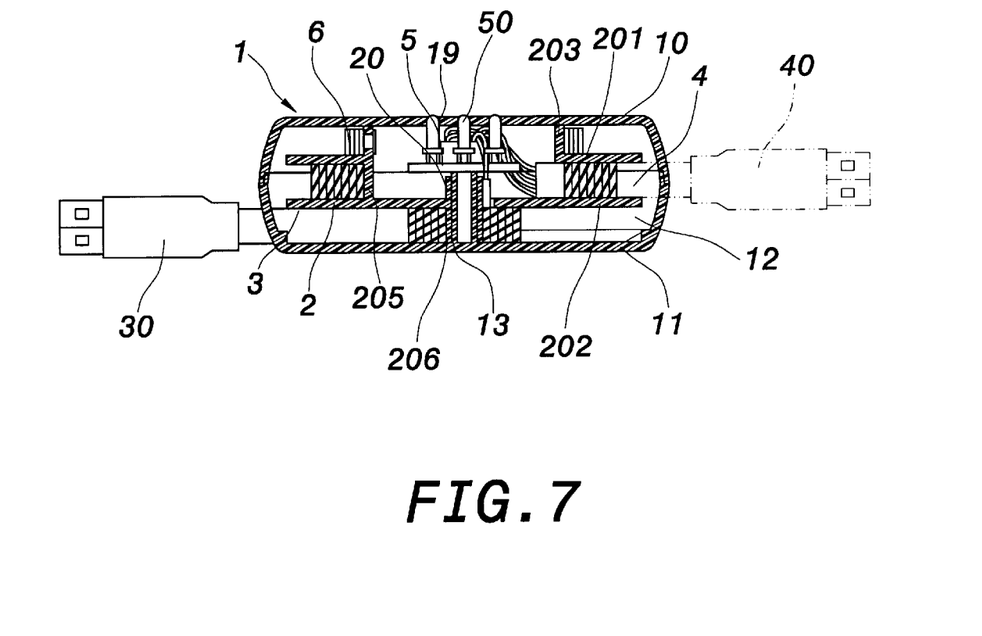
FIG. 7 is a cross-sectional view of the second embodiment of the present invention.

As shown in FIGS. 5 to 7, the housing 1 and the rotation disk 2 of the present invention can vary. The rotation disk 2 can comprises a first disk body 201 and a second disk body 202. The rotation disk 2 has a pivotal hole 20 so that it can be pivotally sleeved on the pivot 13 to rotate. A first winding ring 203 is disposed on the first disk body 201. A hook groove 204 is disposed on the first winding ring 203. A second winding ring 205 and a third winding ring 206 are disposed on two side faces of the second disk body 202, respectively. The hook end 60 of the scroll spring 6 received outside the rotation disk 2 can be retained in the hook groove 204 of the first winding ring 203 so that the scroll spring 6 can be disposed between the housing 1 and the rotation disk 2 to provide restoring resiliency of rotation for the rotation disk 2.

Figure 8:
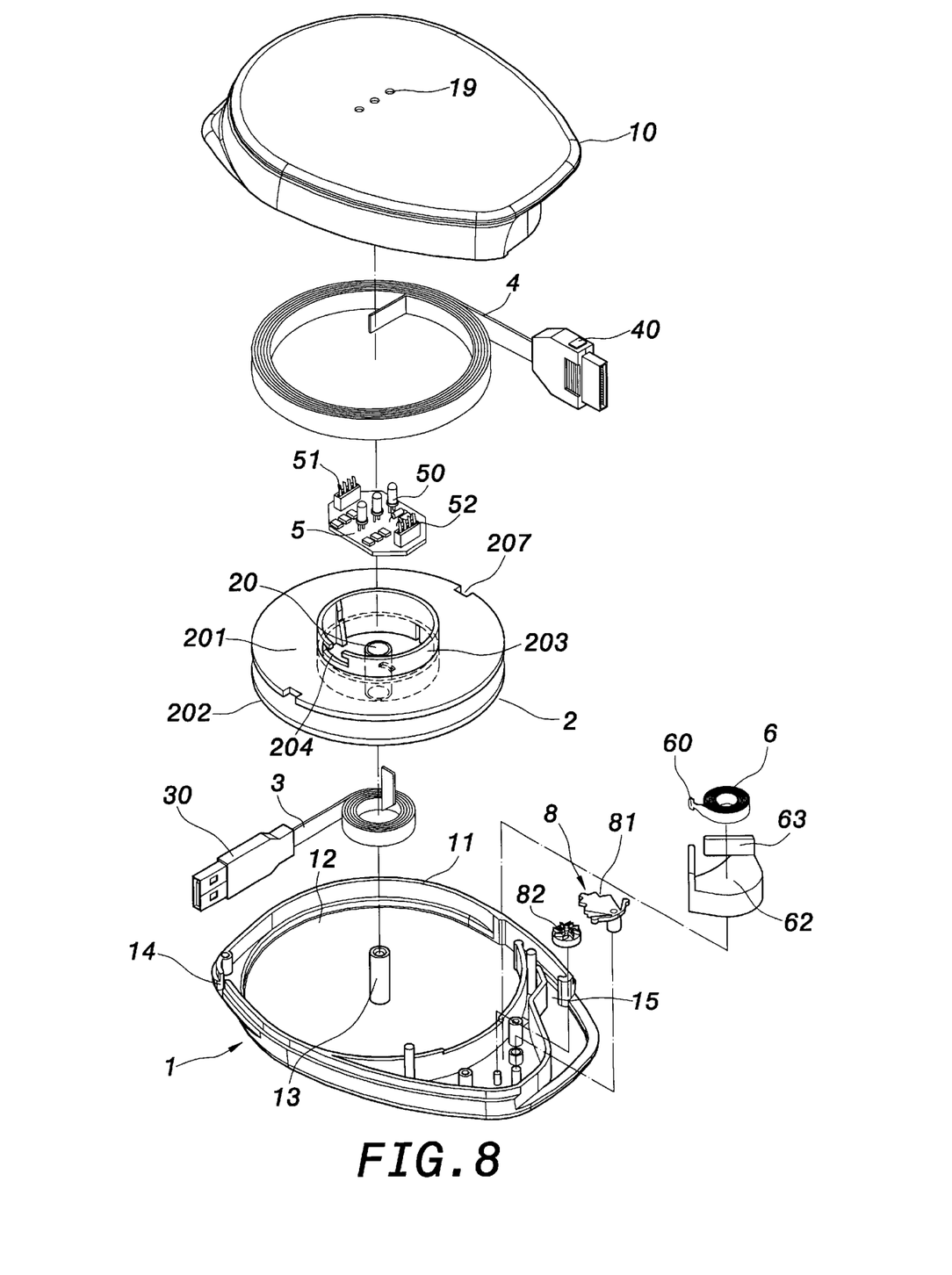
FIG. 8 is an exploded perspective view of a third embodiment of the present invention.

The first communication wire 3 is wound around the third winding ring 206, and the second communication wire 4 is wound around the second winding ring 205. That is, the two communication wires 3 and 4 are wound around two side faces of the second disk body 202 in double layers. Moreover, the first plug 30 and the second plug 40 can be universal serial bus (USB) connectors. The second plug 40 can also be a plug of another type, as shown in FIG. 8. Lamp holes 19 can also be disposed on the housing 1 to correspond to the light-emitting devices 50.

A bearing seat 62 can be disposed in the housing 1. Two stop sheets 63 extend from two sides of the bearing seat 62 so that the scroll spring 6 can be received between the bearing seat 62 and the wall of the housing 1. Additionally, in order that a user will not be disturbed due to the tensile force when he pulls out the communication wires 3 and 4, a plurality of retaining grooves 207 are disposed at a peripheral edge of the rotation disk 2, and a reciprocating control device 8 is disposed adjacent to the rotation disk 2. The reciprocating control device 8 comprises a swing sheet 81 capable of swinging freely and a rag wheel 82 capable of rotating freely. Through the interactive functionality of the swing sheet 81, the rag wheel 82, and the retaining grooves 207 of the rotation 2, the communication wires 3 and 4 can be fixed or received by winding through reciprocating actions of pull and release.

Figure 9:
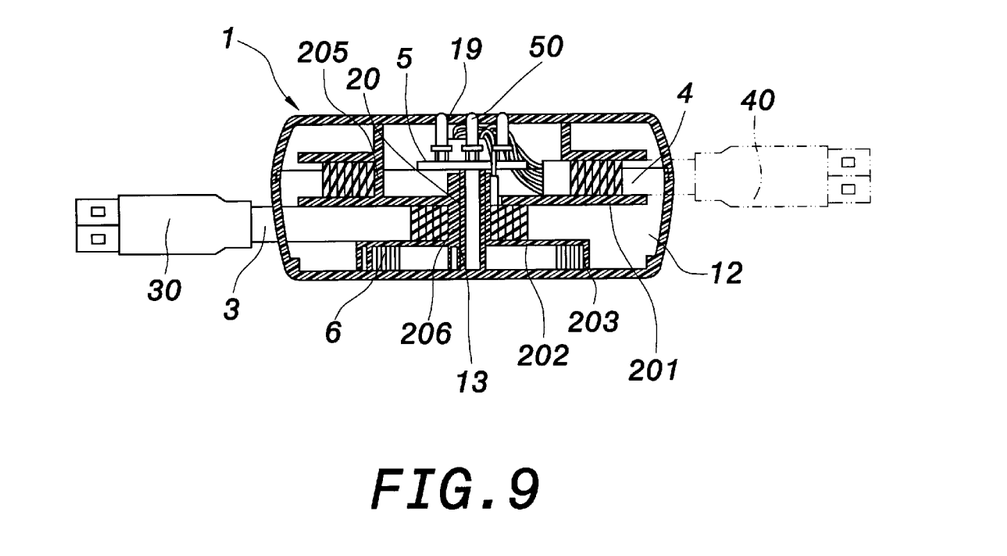
FIG. 9 is a cross-sectional view of a fourth embodiment of the present invention.

As shown in FIG. 9, the rotation disk 2 of the present invention can comprise a first disk body 201 and a second disk body 202. The rotation disk 2 has a pivotal hole 20 so that it can be pivotally sleeved on the pivot 13 to rotate. A first winding ring 203 is disposed on the second disk body 202. The scroll spring 6 is received in the first winding ring 203 so that the scroll spring 6 can be disposed between the housing 1 and the rotation disk 2 to provide restoring resiliency of rotation for the rotation disk 2. A second winding ring 205 and a third winding ring 206 are disposed on two side faces of the first disk body 201, respectively. The first communication wire 3 is wound around the third winding ring 206, and the second communication wire 4 is wound around the second winding ring 205. That is, the two communication wires 3 and 4 are wound around two side faces of the second disk body 201 in double layers.

Figure 10:
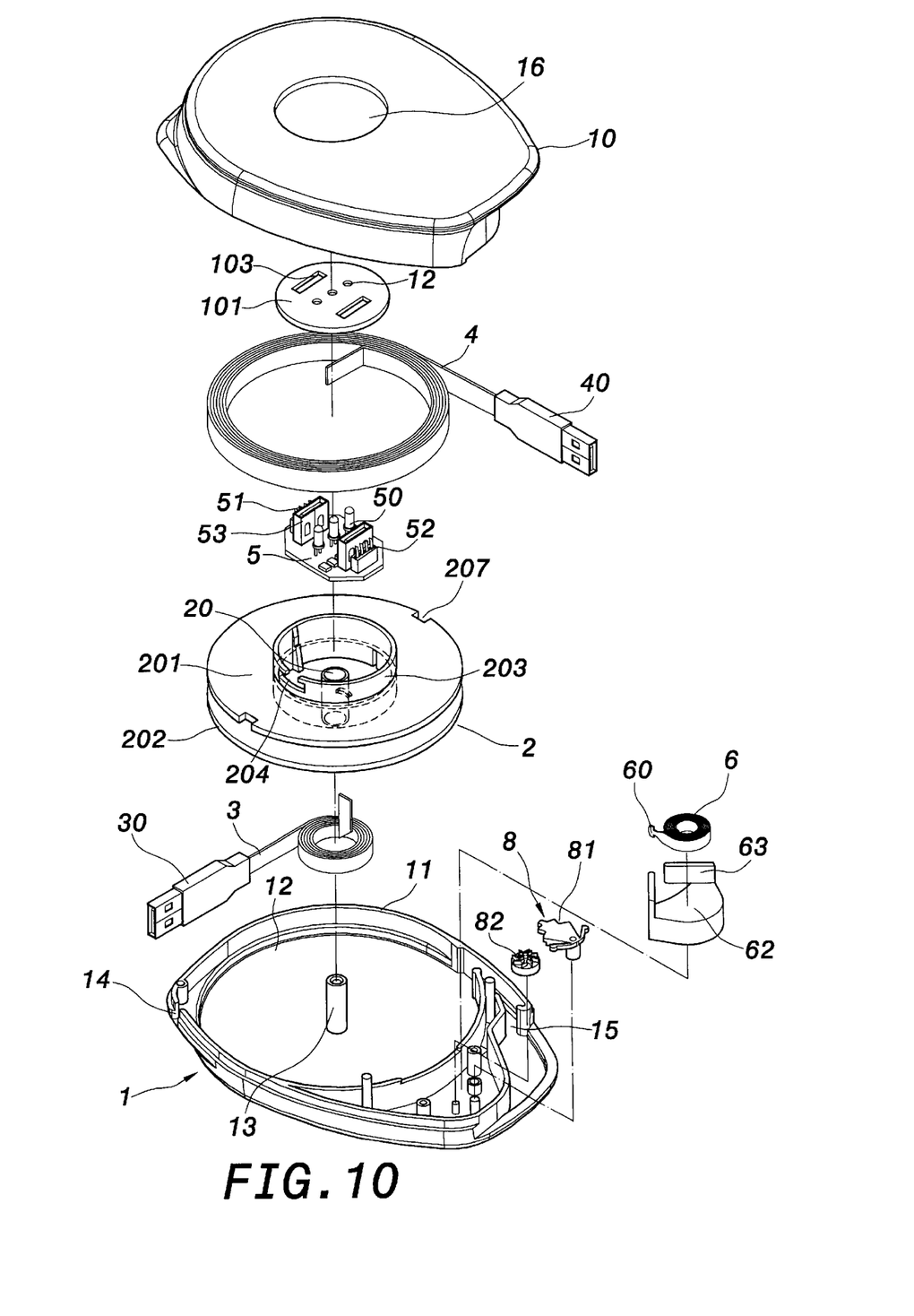
FIG. 10 is an exploded perspective view of a fifth embodiment of the present invention.

As shown in FIG. 10, the through hole 16 on the housing 1 of the present invention can also be fixedly retained and matched with a cover board 101 so that the through hole 16 can be closed. Lamp holes 102 corresponding to the light-emitting devices 50 are disposed on the cover board 101 of the housing 1. Two female seats 53 are disposed on the circuit board 5. Openings 103 corresponding to the two female seats 53 are disposed on the cover board 101. The two female seats 53 can be inserted by communication apparatuses.

Figure 11:
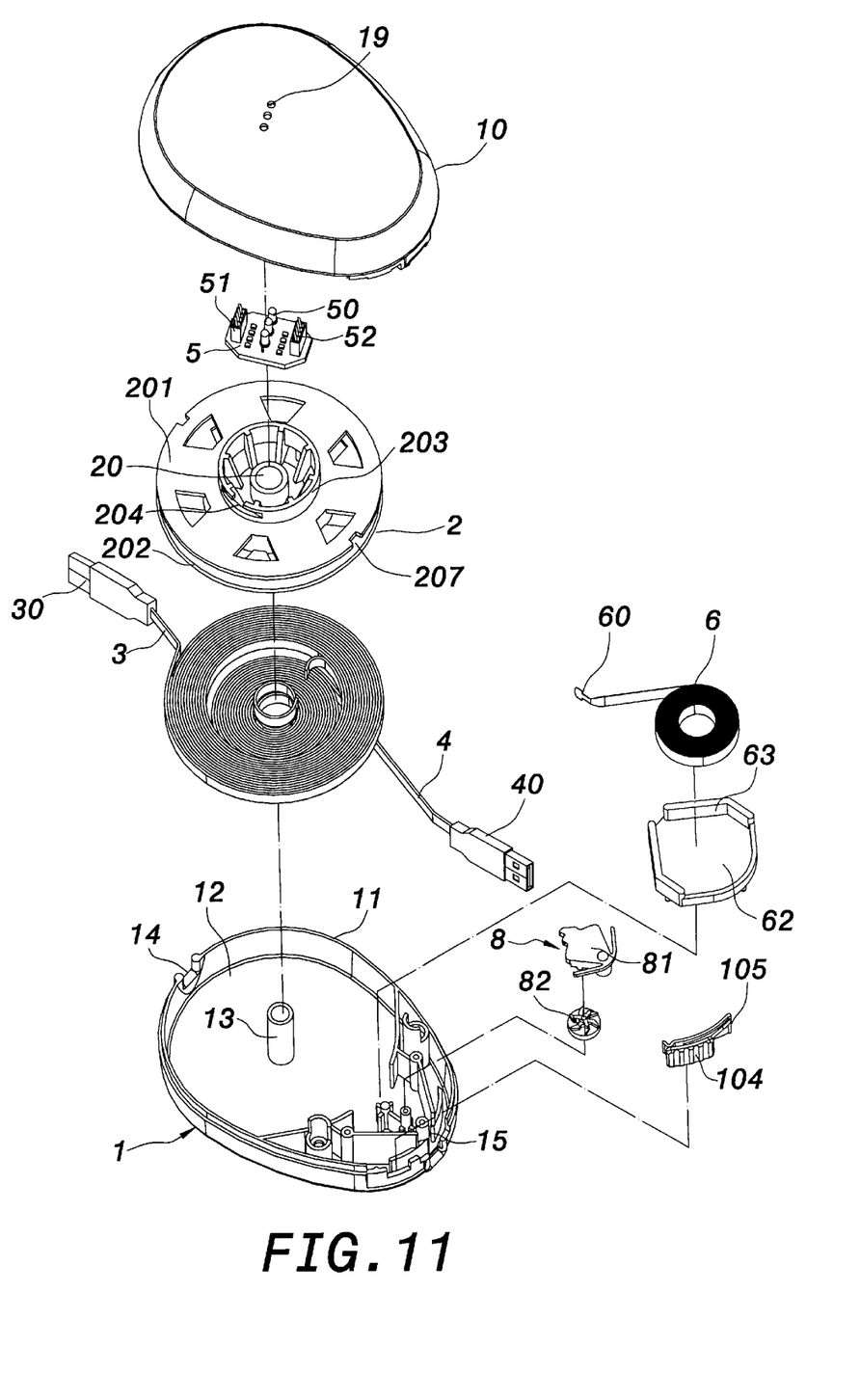
FIG. 11 is an exploded perspective view of a sixth embodiment of the present invention.

As shown in FIG. 11, a catching button 104 can be disposed beside the housing 1 of the present invention. The catching button 104 is slidably matched beside the housing 1. A catching portion 105 is disposed at an end of the catching button 104. When the catching button 104 is pushed toward the direction of the communication wire 4, the catching portion 105 can abut against the communication wire 4 to catch the communication wire 4 so that the communication wire 4 cannot be pulled to move. Therefore, only the communication wire 3 can be pulled to move. When the catching button 104 is pushed toward the opposite direction, the catching portion 105 can be detached from the communication wire 4 to achieve the effect of releasing the communication wire 4 so that both the two communication wires 3 and 4 can be pulled to move.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A wire-winding box having multiple transmission function, comprising:
    a housing having a receiving tank formed therein;
    a rotation disk pivotally disposed in said receiving tank;
    a scroll spring disposed between said housing and said rotation disk;
    two communication wires wound on said rotation disk, each of said communication wires having an outer end and an inner end, a conducting terminal being located at said inner end of said each communication wire, outer ends of said two communication wires protruding out of said housing through wire outlets formed therein; and
    a circuit board disposed in said housing, said circuit board including:
        a pair of conducting terminals, each of said conducting terminals of said circuit board being coupled to a respective one of said conducting terminals on said inner ends of said two communication wires; and
        light-emitting diodes disposed on said circuit board for indicating the communication status between said two communication wires.

2. The wire-winding box having multiple transmission function as claimed in claim 1, wherein a pivot is disposed in said receiving tank of said housing, and said rotation disk has a pivotal hole so that it can be pivotally sleeved on said pivot to rotate, a first winding ring being disposed on a side face of said rotation disk, said first winding disk having a hook groove, which can be retained with a hook end of said scroll spring.

3. The wire-winding box having multiple transmission function as claimed in claim 1, wherein a catching button is slidably matched beside said housing, said catching button having a catching portion, which can abut against said communication wires to catch said communication wires.

4. The wire-winding box having multiple transmission function as claimed in claim 1, wherein said rotation disk comprises a first disk body and a second disk body, said first disk body having a first winding ring thereon, said first winding ring having a hook groove thereon, a second winding ring and a third winding ring being respectively disposed on two side faces of said second disk body, a hook end of said scroll spring being capable of retained with said hook groove of said first winding ring, one of said communication wires being wound around said third winding ring, the other one of said communication wires being wound around said second winding ring.

5. The wire-winding box having multiple transmission function as claimed in claim 1, wherein said rotation disk comprises a first disk body and a second disk body, said second disk body having a first winding ring thereon, said scroll spring being received in said first winding ring, a second winding ring and a third winding ring being respectively disposed on two side faces of said first disk body, one of said communication wires being wound around said third winding ring, the other one of said communication wires being wound around said second winding ring.

6. The wire-winding box having multiple transmission function as claimed in claim 1, wherein the outer ends of said two communication wires are connected to a first plug and a second plug, respectively.

7. The wire-winding box having multiple transmission function as claimed in claim 1, wherein a plurality of first conducting terminals and second conducting terminals are disposed on said circuit board, and said first conducting terminals and said second conducting terminals are respectively connected to the inner ends of said two communication wires so that said circuit board can be connected between the inner ends of said two communication wires.

8. The wire-winding box having multiple transmission function as claimed in claim 1, wherein female seats are disposed on said circuit board, and corresponding openings are disposed on said housing.

9. A wire-winding box having multiple transmission function, comprising:
    (a) a housing having a receiving tank therein;
    (b) a rotation disk pivotally disposed in said receiving tank;

(c) a scroll spring disposed between said housing and said rotation disk;

(d) two communication wires wound on said rotation disk, outer ends of said two communication wires protruding out of said housing;

(e) a circuit board disposed in said housing, light-emitting devices being disposed on said circuit board, said circuit board being connected between inner ends of said two communication wires;

(f) a pivot disposed in said receiving tank of said housing;

(g) a pivotal hole formed in said rotation disk for being pivotally sleeved on said pivot to rotate;

(h) a first winding ring disposed on a side face of said rotation disk, said first winding disk having a hook groove engaged with a hook end of said scroll spring;

(i) a second winding ring disposed on the other side face of said rotation disk;

(j) lamp holes formed on said second winding ring, said light-emitting devices corresponding to said lamp holes;

(k) two wire grooves disposed on a sidewall of said second winding ring, said two communication wires being wound around said second winding ring, the inner ends of said two communication wires penetrating into said second winding ring via said wire grooves, said circuit board and said light-emitting devices being disposed in said second winding ring; and (l) a through hole formed on said housing, said second winding ring being pivotally sleeved in said through hole.

10. The wire-winding box having multiple transmission function as claimed in claim 4, wherein a catching button is slidably matched beside said housing, said catching button having a catching portion, which can abut against said communication wires to catch said communication wires.

11. The wire-winding box having multiple transmission function as claimed in claim 9, wherein said rotation disk comprises a first disk body and a second disk body, said first disk body having a first winding ring thereon, said first winding ring having a hook groove thereon, a second winding ring and a third winding ring being respectively disposed on two side faces of said second disk body, a hook end of said scroll spring engaging said hook groove of said first winding ring, each of said communication wires being wound around a respective one of said second and third winding rings.

12. The wire-winding box having multiple transmission function as claimed in claim 9, wherein said rotation disk comprises a first disk body and a second disk body, said second disk body having a first winding ring thereon, said scroll spring being received in said first winding ring, a second winding ring and a third winding ring being respectively disposed on two side faces of said first disk body, each of said communication wires being wound around a respective one of said second and third winding rings.

13. The wire-winding box having multiple transmission function as claimed in claim 9, wherein the outer ends of said two communication wires are connected to a first plug and a second plug, respectively.

14. The wire-winding box having multiple transmission function as claimed in claim 9, wherein a plurality of first conducting terminals and second conducting terminals are disposed on said circuit board, and said first conducting terminals and said second conducting terminals are respectively connected to the inner ends of said two communication wires.

15. The wire-winding box having multiple transmission function as claimed in claim 9, wherein female seats are disposed on said circuit board, and corresponding openings are formed on said housing.

16. A wire-winding box having multiple transmission function, comprising:

(a) a housing having a receiving tank therein;

(b) a rotation disk pivotally disposed in said receiving tank;

(c) a scroll spring disposed between said housing and said rotation disk;

(d) two communication wires wound on said rotation disk, outer ends of said two communication wires protruding out of said housing;

(e) a circuit board disposed in said housing, light-emitting devices being disposed on said circuit board, said circuit board being connected between inner ends of said two communication wires; and (f) a control device, said control device comprising a push button and a spring, a plurality of stop blocks having unidirectional catching function being disposed on said rotation disk, said push button being engaged in a push button hole formed on said housing, said spring being disposed between said push button and said housing, said push button having a catching block formed thereon, and said catching block engaging said stop block timely to catch said rotation disk when said rotation disk rotates.

* * * * *